United States Patent [19]
Sanders et al.

[11] 4,087,628
[45] May 2, 1978

[54] CARRIER LOCK DETECTOR

[75] Inventors: David E. Sanders; Alfred T. Anderson, both of St. Petersburg; Robert S. Gordy, Largo, all of Fla.

[73] Assignee: E-Systems, Inc., Dallas, Tex.

[21] Appl. No.: 731,963

[22] Filed: Oct. 13, 1976

Related U.S. Application Data

[63] Continuation of Ser. No. 591,193, Jun. 27, 1975, abandoned.

[51] Int. Cl.² .............................................. G08B 21/00
[52] U.S. Cl. ...................................... 178/88; 325/341; 329/111; 329/122; 340/207 P; 340/253 Y
[58] Field of Search ..................... 340/207 P, 253 Y; 325/341, 346, 419–421; 329/111, 122; 178/88

[56] References Cited

U.S. PATENT DOCUMENTS

| 2,926,344 | 2/1960 | Koehler | 340/253 Y |
| 3,758,852 | 9/1973 | Nowell et al. | 340/253 Y |
| 3,838,294 | 9/1974 | Leete | 340/253 Y |

OTHER PUBLICATIONS

*Phase-Locked Loop Includes Lock Indicator*; Connelly et al. Electronics; vol. 47, #18, pp. 112-113; 9/74; McGraw-Hill.
*How Phase-Locked Loops Work*; Cohen; Popular Electronics vol. 7, #2; pp. 32-34; 2/75; Ziff-Davis Publ.

*Primary Examiner*—Marshall M. Curtis
*Attorney, Agent, or Firm*—Robert V. Wilder

[57] ABSTRACT

Apparatus for indicating a phase lock condition between an incoming multiphase carrier signal and a local oscillator in a phase-locked loop demodulator. A phase error signal is generated by phase comparing the carrier signal and the local oscillator signal. The phase error signal is rectified and the result detected for a range of values that indicate a phase lock condition. Phase lock exists when the phase error signal is within selected voltage ranges. After detection, the error signal is low-pass filtered and compared to a predetermined threshold value to generate a phase-lock indication signal. In the last two steps, an indication signal is generated to signify that the phase error signal is in the range of voltage values corresponding to phase lock for a greater percentage of time than it is within this range with the loop is not phase locked.

6 Claims, 6 Drawing Figures

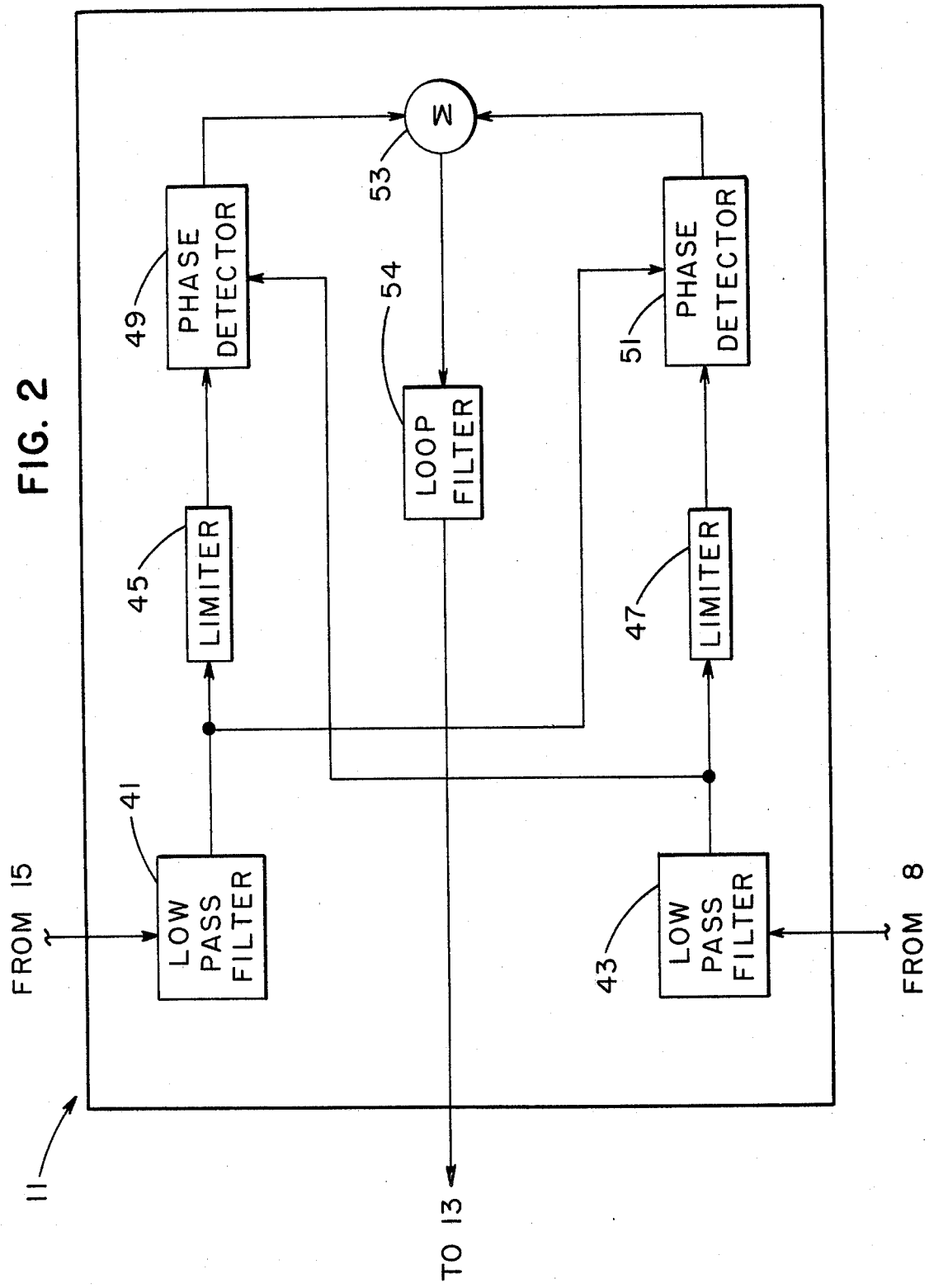

CARRIER LOCK DETECTOR

This is a continuation of application Ser. No. 591,193, filed June 27, 1975, abandoned Oct. 13, 1976.

BACKGROUND OF THE INVENTION

The present invention is directed to the field of carrier lock detectors for detecting phaselock conditions in four-phase PSK demodulators. One method of transmitting digital data between locations is the four-phase PSK method wherein data bits are paired and used to modulate two carrier signals, which signals are of the same frequency but displaced in phase. PSK modulation causes a change in the relative phase of the carrier signal. As an example, if the data bit is binary in form, the carrier signal may have a relative phase of either 0° or 180° depending upon whether a binary 1 or a binary 0 is to be transmitted respectively. In a four-phase PSK system the second carrier signal is shifted 90°; therefore it will have a relative phase of either +90° or −90° depending upon whether a binary 1 or a binary 0, respectively, is to be transmitted. The two modulated carrier signals are combined to generate a single carrier signal which contains data in the form of phase shifts.

Demodulation of the modulated carrier signal is accomplished in the receiver by comparing the phase of the modulated carrier with that of a reference signal having the same frequency and some fixed relationship with respect to the modulated carrier. Generally speaking then, the output signals from the demodulators are compared in a phaselock loop circuit wherein a control signal is generated, which signal is proportional to the difference in phase between the phase of the local oscillator and the modulated carrier signal. The signal from the phaselock loop is used to place the phase of the local oscillator into some fixed phase relationship with respect to the carrier signal. In a number of prior art systems the phasing of the local oscillator signal is synchronized with the phase of the modulated carrier signals. Demodulation then is accomplished through synchronous detection, which detection is also known by the term homodyne detection. If the local oscillator is not locked in a fixed relationship with respect to the modulated carrier signal an error will occur in the detection of the modulating data. It therefore becomes desirable to have a means whereby an out-of-lock condition, or an in-lock condition is indicated, so as to enable an operator of the system to determine if valid data is being received versus, for example, invalid data.

A prior art patent of interest is U.S. Pat. No. 3,456,196, entitled "Digital Automatic Frequency Control System," by H. A. Schneider. In the aforementioned patent there is disclosed a device wherein an incoming double sideband suppressed carrier signal is mixed with the voltage from a local voltage tuned oscillator to produce a pair of quadrature demodulated signals. A translator is used to provide signals indicative of the difference between the carrier and the local oscillator signal. A difference counter compares the digital pulses, and provides a count which is indicative of the difference. The provided count is then converted into an analog signal for control of the voltage oscillator. A locked indicator circuit is used to monitor the output signal of the difference counter to indicate when phaselock is obtained. Two signal channels are provided within the locked monitor, each channel consisting of an OR gate, a single shot multivibrator, and a peak detector. The lock indicator receives signals from two portions of the receiver circuit in order to accurately determine when a locked condition exists versus, for example, a condition of receiving no signal at all.

The present inventive carrier lock detector does not require the services of a difference counter or a translator in order to indicate the condition of loop phaselock.

Another prior art patent of interest is U.S. Pat. No. 3,525,945, entitled, "System For Reconstituting A Carrier Reference Signal Using A Switchable Phaselock Loop," by J. G. Puente. The lock detector described in the patent operates by comparing the output signal from a phaselock loop against the signal being fed to the phaselock loop. If the two signals are in phase, a multiplier output signal will be at maximum value which value will be greater than a determined threshold level. By utilizing a threshold detector set at the determined threshold level the device provides an output signal when the product signal is above the threshold level to thereby indicate a locked condition. The present invention, unlike the foregoing device, does not require a comparison of the output signal from the phaselock loop in order to make a determination as to whether or not there is a condition of phaselock.

SUMMARY OF THE INVENTION

The present invention is a carrier lock detector particularly adapted for use with a receiver of the type for receiving and demodulating a multiphase modulated carrier signal, for example, data phase shift keyed quadrature carrier signals wherein balanced demodulators recover demodulated data signals by comparing a local oscillator generated carrier signal against the received modulated carrier signal. Means are provided in the carrier lock detector for rectifying the signal from one of the balanced demodulators. A threshold detector means is provided for generating a signal which is indicative of whether the rectified signal is, or is not, within a predetermined magnitude range. A gating means responsive to the signal from the threshold detector provides a signal of a first state if the threshold detector signal is within the determined magnitude range, and a signal of a second state if the threshold detector signal is not within the predetermined magnitude range. An averaging means provides a signal indicative of the percentage of time that the gating means signal is in the first state versus the amount of time the gating means signal is in the second state. A second threshold detector indicates a lock condition when the percentage of time in the first state is above a preselected magnitude and indicates an unlocked condition for all other conditions.

It is therefore a primary object of the present invention to provide an improved carrier lock detection circuit.

It is another object of the present invention to provide a carrier lock detecting circuit which utilizes only a single input signal.

It is another object of the present invention to provide a carrier clock detection circuit which utilizes a minimum number of components.

It is yet another object of the present invention to provide a relatively simple technique for detecting carrier lock in a four-phase PSK receiver.

These and further objects of the present invention will become more apparent and better understood when taken in conjunction with the following description and drawings, throughout which like characters indicate like parts, and which drawings form a part of this application.

BRIEF DESCRIPTION OF THE DRAWINGS

FIG. 2 is a detailed block diagram of one of the blocks illustrated in the schematic diagram of FIG. 1.

DESCRIPTION OF THE PREFERRED EMBODIMENT OF THE INVENTION

Figure 1:
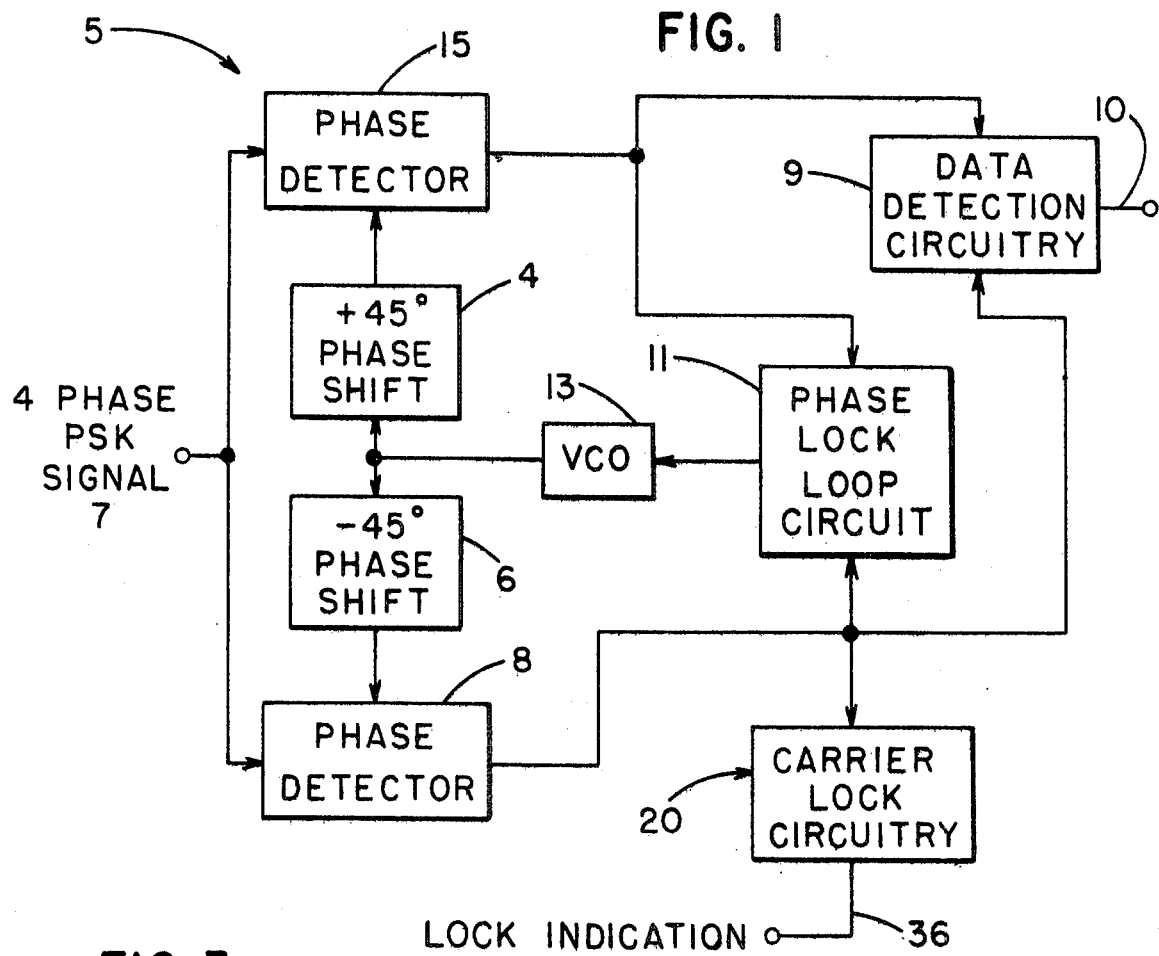
FIG. 1 is a block schematic diagram of a four-phase PSK demodulator utilizing the present invention.

Referring to FIG. 1, the carrier lock detector 20 of the present invention is shown operatively connected to a 2-channel four-phase PSK type demodulator 5. The received four-phase PSK signal is applied to an input terminal 7. The input terminal 7 is connected to the inputs of two phase detectors 8 and 15. A local voltage-controlled oscillator (VCO) 13 provides a reference signal to the phase detector 15, which reference signal is shifted by +45° in the +45° phase shift circuit 4. A second reference signal is supplied by the VCO 13 to the phase detector 8, which reference signal is shifted in phase by −45° in the −45° phase shift circuit 6. The signal from the VCO 13 is substantially identical to the carrier signal used in the transmitter (not shown). The phase detectors 8 and 15 may, for example, be double balanced mixers of the type well known in the prior art. It is a characteristic of double balanced mixers to provide an output signal that is a function of the phase difference between received input signals. The output signal provided by each of the phase detectors is applied to a phaselock loop circuit 11. The output signal from the phaselock loop 11 drives the VCO 13 to provide a signal, the phase of which in the lock condition is ±45°, or any integer multiple thereof of 90°. Data detection circuitry 9 receives as inputs the demodulated signals from the phase detectors 15 and 8. The data detection circuitry provides as an output, to terminal 10, the data signals which correspond to the data signals that were used to modulate the carrier at the transmitter. The carrier lock detector circuit is connected to receive the demodulated output signal from one of the phase detectors. In the preferred embodiment shown, the output is received from the phase detector 8.

Referring now to FIG. 2, the phaselock loop circuit 11 of FIG. 1 is shown comprised of a pair of low pass filters 41 and 43, a pair of limiters 45 and 47, a pair of phase detectors 49 and 51, a summer 53, and a loop filter 54. The low pass filter 41 rceives as an input the signal present on the output of the phase detector 15. The output of the low pass filter 41 is connected to the limiter 45 and to an input of phase detector 51. The output of limiter 45 is connected as an input to the phase detector 49. The low pass filter 43 receives as an input the output signal from phase detector 8. The output of low pass filter 43 is connected to the input of limiter 47 and to an input of phase detector 49. The output of limiter 47 is connected as an input to the phase detector 51. The output signals from phase detectors 49 and 51 are summed in the summing circuit 53, the output of which is fed to the loop filter 54. The output of loop filter 54 is connected to the input of the VCO 13. In operation, the signals from phase detectors 8 and 15 are low pass filtered to bandlimit the noise that may be present on the phase detector signal. The cutoff frequency of the low pass filter is kept high enough to permit indicated data changes to stabilize within one data period. The limiters operate to square up the signals from the low pass filters. The limited (squared-up) signals from each of the limiters are phase compared (multiplied) against the non-limited signal from the other channel's low pass filter to provide a product signal.

The product signals from phase detector 49 and phase detector 51 are added by summer 53. For a lock condition the summed signal from summer 53 will be of a minimum amplitude. Loop filter 54 is designed to provide the particular closed loop compensation characteristics required by the PSK demodulator to achieve loop stability.

The output signal from the loop filter 54 is, therefore, of a minimum value for conditions of lock and for other conditions the signal is of a value such as to drive the VCO output signal into a phase which is ±45° with respect to the input signal to the phase detectors in order to maintain a locked condition.

Figure 3:
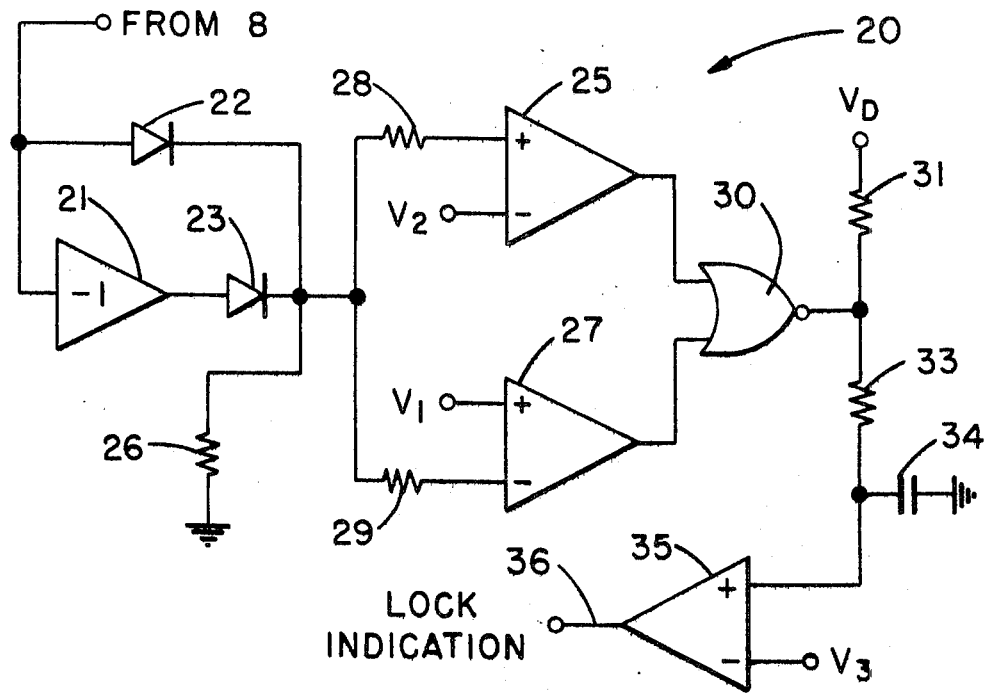
FIG. 3 is a schematic diagram illustrating the preferred embodiment of the invention.

Referring to FIG. 3, the input to the carrier lock detector 20, from phase detector 8, is applied to a full wave rectifier circuit consisting of diodes 22 and 23 along with an inverting amplifier 21. The signal output from the full wave rectifier is applied to a pair of comparators functioning as threshold detectors 25 and 27 via resistors 28 and 29 respectively. Resistor 26 connects the output of the full wave rectifier circuit to a common potential (ground). Resistor 28 connects the rectified signal to the positive terminal of comparator 25, while resistor 29 connects the rectified signal to the negative terminal of comparator 27. The negative input of comparator 25 is connected to a threshold voltage source designated $V_2$, and the positive input of comparator 27 is connected to a threshold voltage designated $V_1$. The output of comparator 25 and the output of comparator 27 are fed as inputs to the NOR gate 30. The output signal from the NOR gate 30 is fed to a low pass filter network comprised of resistor 33 and capacitor 34. The output signal from the filter network is fed to the positive input terminal of a third threshold detector comprised of comparator 35. The negative input terminal of the comparator 35 is connected to a threshold voltage level $V_3$. The output of comparator 35 is the lock indication signal which is fed to the output terminal 36. A resistor 31 is connected to the output of NOR gate 30 and to a voltage supply $V_D$. The purpose of this combination of resistor and voltage supply is to stabilize the amplitude level of the "TRUE" state signal from the NOR gate 30.

Figure 4A:
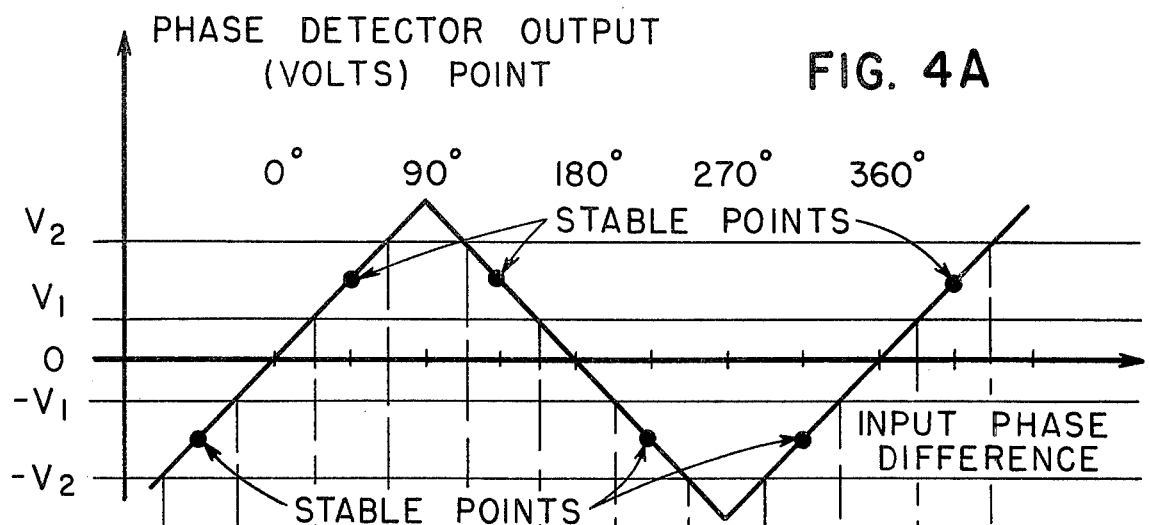
FIGS. 4a and 4b are waveforms which are taken from points located in the schematic diagram of FIG. 3.
Figure 4B:
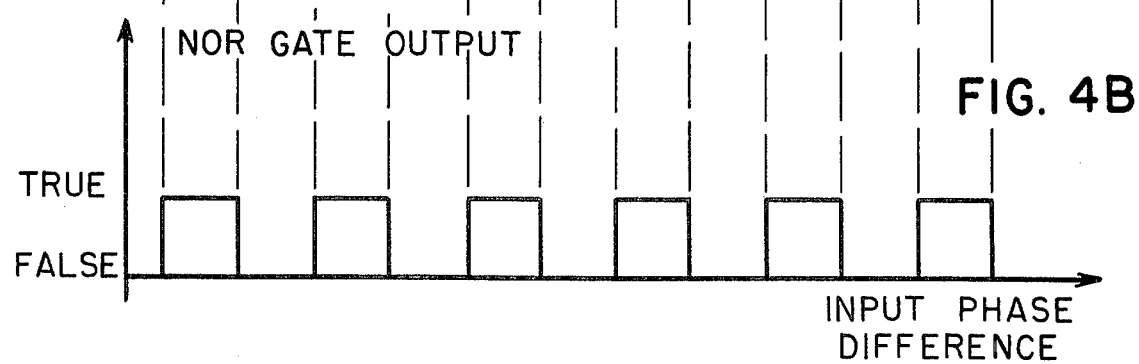

Referring now to FIGS. 4a and 4b in conjunction with FIG. 3, the output signal from the phase detector 8, which signal is the input signal to the full wave rectifier of FIG. 3 is shown in FIG. 4a. The output signal shown is for a condition of no phaselock wherein the signal is a function of the phase difference between the signals applied to the phase detector. The points at which the loop will lock are shown as heavy dots and are identified as the stable points. The presence of noise or phase jitter at the input to the phase detectors will cause some variation in the actual position of these points. The lock detection technique utilized herein works by determining that the output of the phase detector 8 is usually in the vicinity of one of the stable points.

In operation, the output signal from one of the phase detectors is first full wave rectified and then sent to the two threshold detectors 25 and 27. The threshold detectors 25 and 27 are set to switch output states at the voltage levels $V_1$ and $V_2$, respectively. In FIG. 4a it can be observed that the amplitude level band surrounding the stable points is set by the voltage levels $V_1$ and $V_2$. The full wave rectifier circuit achieves a folding of the waveform shown in FIG. 4a about the 0 level. Therefore, even though the input signal to the full wave rectifier goes negative, the output of the full wave rectifier will always be some positive value. With the output signal from the two threshold detectors 25 and 27 being fed to the NOR gate, the output signal from the NOR gate will assume, for example, one binary state (TRUE) if the phase detector output lies between the $V_1$ and $V_2$ threshold levels or between the $-V_1$ and $-V_2$ threshold levels as shown in FIG. 4b. The output signal from the NOR gate will assume the other binary state (FALSE) if the output signal is not within the band defined by the threshold levels $V_1$ and $V_2$. When the phaselock loop is in a locked condition, the phase difference is near one of the stable points and the output of the NOR gate is always, or nearly always, "TRUE." When the loop is not in lock, the output of the NOR gate is sometimes "TRUE" and sometimes "FALSE," as shown in FIG. 4b. By filtering, or averaging the signal from the NOR gate, an indication will be provided as to whether or not the output from the NOR gate is usually "TRUE"; that is, whether the percentage of time that the output is "TRUE" is greater than the percentage of time that the output is "FALSE." The filter circuit comprised of resistor 33 and capacitor 34 provides the necessary averaging feature. The averaging signal from the filter is then fed to the threshold detector comprised of comparator 35.

Figure 5:
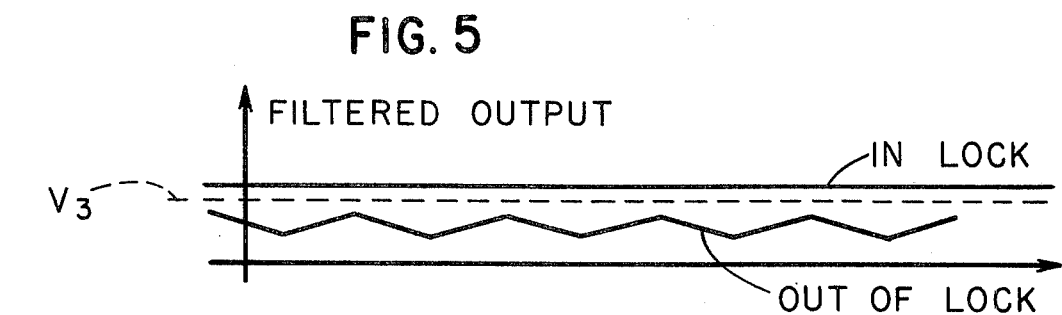
FIG. 5 is a waveform illustrating an operating condition of a particular point in the preferred embodiment shown in FIG. 3.

Referring now to FIG. 5 in conjunction with FIG. 3, it is shown that the filtered output signal, applied to the positive input of comparator 35, for an in lock condition is substantially a D.C. signal having a level greater than the voltage level $V_3$. For an out-of-lock condition the signal from the filter will have an amplitude level which is below the voltage level $V_3$. By adjusting the level of $V_3$ it is possible to choose a value whereby the probability of a false lock indication can be exchanged for the probability of a missed lock indication. In addition, the values of voltage levels $V_1$ and $V_2$ can still be adjusted to maximize the desired stability. The output signal from comparator 35 is therefore a lock indication signal, which signal is a measure of the percentage of time that the output signal from the phase detector 8 spends in the vicinity of the output value it has when the system is in the lock condition.

While there has been shown what is considered to be the preferred embodiment of the invention, it will be manifest that many changes and modifications may be made therein without departing from the essential spirit of the invention. It is intended, therefore, in the annexed claims to cover all such changes and modifications as may fall within the true scope of the invention.

What is claimed is:

1. Apparatus for detecting phase lock between a multiphase carrier signal and a local oscillator signal in a phase-locked loop demodulator, comprising:
   a. first means for generating a phase differential signal by phase comparing said multiphase carrier signal and said local oscillator signal,
   b. second means for generating a first signal by full-wave rectifying said phase differential signal,
   c. third means responsive to said first signal for generating a second signal with a first state when the amplitude of said first signal is between a pair of predetermined amplitude values and with a second state when the amplitude of said first signal is not between said pair of predetermined amplitude values,
   d. fourth means responsive to said second signal for generating a phase lock indication signal when the ratio of the duration of said first state of said second signal to the duration of said second state of said second signal exceeds a predetermined magnitude.

2. Apparatus as recited in claim 1 wherein said fourth means comprises:
   (a) fifth means for generating a third signal by low-pass filtering said second signal,
   (b) sixth means for generating said phase lock indication signal by threshold detecting said third signal.

3. Apparatus as recited in claim 1 including indicator means responsive to said fourth signal.

4. Apparatus as recited in claim 1 wherein said third means comprises:
   a. a first threshold detector responsive to said first signal and a first preselected amplitude signal for generating a fifth signal,
   b. a second threshold detector responsive to said first signal and a second preselected amplitude signal for generating a sixth signal, and
   c. a NOR gate responsive to said fifth signal and said sixth signal for generating said second signal.

5. A method for detecting phase-lock between a multiphase carrier signal and a local oscillator signal in a phase-locked loop demodulator comprising the steps of:
   a. generating a phase differential signal responsive to the phase relationship of said multiphase carrier signal and said local oscillator signal,
   b. rectifying said phase differential signal to produce a first signal,
   c. generating a second signal responsive to said first signal with said second signal having a first state when the amplitude of said first signal is within a predetermined amplitude range and having a second state when the amplitude of said first signal is not within said predetermined amplitude range,
   d. generating a phase lock indication signal responsive to said second signal when the ratio of the period of said first state of said second signal to the period of said second state of said second signal exceeds a predetermined magnitude.

6. A method for detecting phase lock between a multiphase carrier signal and a local oscillator signal in a phase-locked loop demodulator as recited in claim 5 wherein said step of generating a phase lock indication signal comprises:
   (a) generating a third signal by low-pass filtering said second signal,
   (b) generating said phase lock indication signal by threshold detecting said third signal.

* * * * *